United States Patent

Gilbert et al.

[11] Patent Number: 5,957,027
[45] Date of Patent: Sep. 28, 1999

[54] DETENT MECHANISM FOR A HYDRAULIC POWER STEERING GEAR

[75] Inventors: Wendell L. Gilbert, Pleasant Shade; Michael R. Morsches, Lebanon, both of Tenn.; Fredrick D. Venable, Lafayette, Ind.

[73] Assignee: TRW Inc., Lyndhurst, Ohio

[21] Appl. No.: 09/163,515

[22] Filed: Sep. 30, 1998

[51] Int. Cl.⁶ .................................................. F15B 9/10
[52] U.S. Cl. .................. 91/375 A; 91/375 R; 137/625.23
[58] Field of Search ............................ 91/375 R, 375 A; 137/625.23, 625.24; 180/421, 423

[56] References Cited

U.S. PATENT DOCUMENTS

| | | |
|---|---|---|
| 4,872,393 | 10/1989 | Rabe et al. . |
| 5,233,906 | 8/1993 | Bishop et al. . |
| 5,562,016 | 10/1996 | Schoffel ................................ 91/375 A |
| 5,575,193 | 11/1996 | Bareis et al. ........................... 91/375 A |
| 5,667,034 | 9/1997 | Jones et al. ......................... 91/375 A X |
| 5,697,400 | 12/1997 | Pfeifer ................................ 91/375 A X |
| 5,797,309 | 8/1998 | Eberhart ................................ 91/375 A |

FOREIGN PATENT DOCUMENTS

0585259B1  8/1997  European Pat. Off. .

Primary Examiner—Hoang Nguyen
Attorney, Agent, or Firm—Tarolli, Sunheim, Covell, Tummino & Szabo

[57] ABSTRACT

A hydraulic power steering gear (10) comprises first and second relatively rotatable valve members (40 and 42). The first valve member (40) includes a radially extending passage (64). The second valve member (42) has an arcuate cam surface (184). A detent member (220) acts between the first and second valve members (40 and 42). The detent member (220) has a curved outer surface (252). A spring (240) biases the detent member (220) radially outward against the cam surface (184). The spring (240) is disposed in the radially extending passage (64) in the first valve member (40). The detent member (220) is disposed in the arcuate cam surface (184) in the neutral condition and provides a physically perceptible indication to a driver of the vehicle of operation of the steering gear (10) between the neutral condition and the actuated condition.

22 Claims, 6 Drawing Sheets

DETENT MECHANISM FOR A HYDRAULIC POWER STEERING GEAR

FIELD OF THE INVENTION

The present invention relates to a hydraulic power steering gear and, in particular, relates to a detent mechanism for an integral hydraulic power steering gear for turning dirigible wheels of a vehicle to effect steering of the vehicle.

BACKGROUND OF THE INVENTION

Integral hydraulic power steering gears are known. "Integral" refers to a steering gear containing a manual steering mechanism, a hydraulic control valve assembly, and a hydraulic power cylinder integrated into a single unit.

The hydraulic power cylinder typically comprises a chamber divided into two chamber portions by a piston. The piston has a set of teeth which mesh with a sector gear fixed to an output shaft. The output shaft is connected via steering linkage to dirigible wheels of a vehicle to steer the vehicle when the output shaft is rotated.

The hydraulic control valve assembly controls the flow of pressurized hydraulic fluid between a hydraulic pump and one of the chamber portions to control the direction and amount of steering. The valve assembly typically comprises two relatively rotatable valve elements, one of which is connected to a rotatable input shaft coupled to the vehicle steering wheel. The other valve element is connected with a follow-up member, such as a ball screw drive, which rotates in response to movement of the piston. The ball screw drive provides a direct connection between the input shaft and the piston to allow for manual steering of the vehicle in the event of hydraulic fluid pressure loss.

It is desirable for such an integral hydraulic power steering gear to provide the driver of the vehicle with a physically perceptible indication of operation of the steering gear between a neutral steering condition, in which the vehicle is being driven in a straight line, and an actuated steering condition, in which the vehicle is being turned. It is known to use a detent mechanism to provide the aforementioned physically perceptible indication to the driver.

SUMMARY OF THE INVENTION

The present invention is a hydraulic power steering gear for a vehicle. The power steering gear is operable between a neutral condition and an actuated condition. The power steering gear comprises first and second valve members disposed coaxial to one another and which are rotatable relative to one another to selectively port hydraulic fluid. The first valve member includes a radially extending passage. The second valve member has an arcuate cam surface associated with the second valve member. A detent member acts between the first and second valve members. The detent member has a curved outer surface. A spring biases the detent member radially outward against the cam surface. The spring is disposed in the passage in the radially extending first valve member. The detent member is disposed in the arcuate cam surface associated with the second valve member in the neutral condition and provides a physically perceptible indication to a driver of the vehicle of operation of the steering gear between the neutral condition and an actuated condition.

The power steering gear further comprises a plunger member disposed in the radially extending passage in the first valve member. The plunger member has an arcuate indentation for supporting the detent member.

A ring member is fixedly attached to the second valve member. The ring member includes a cylindrical inner surface. The arcuate cam surface associated with the second valve member is formed in the cylindrical inner surface of the ring member.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF PREFERRED EMBODIMENTS

Figure 1:
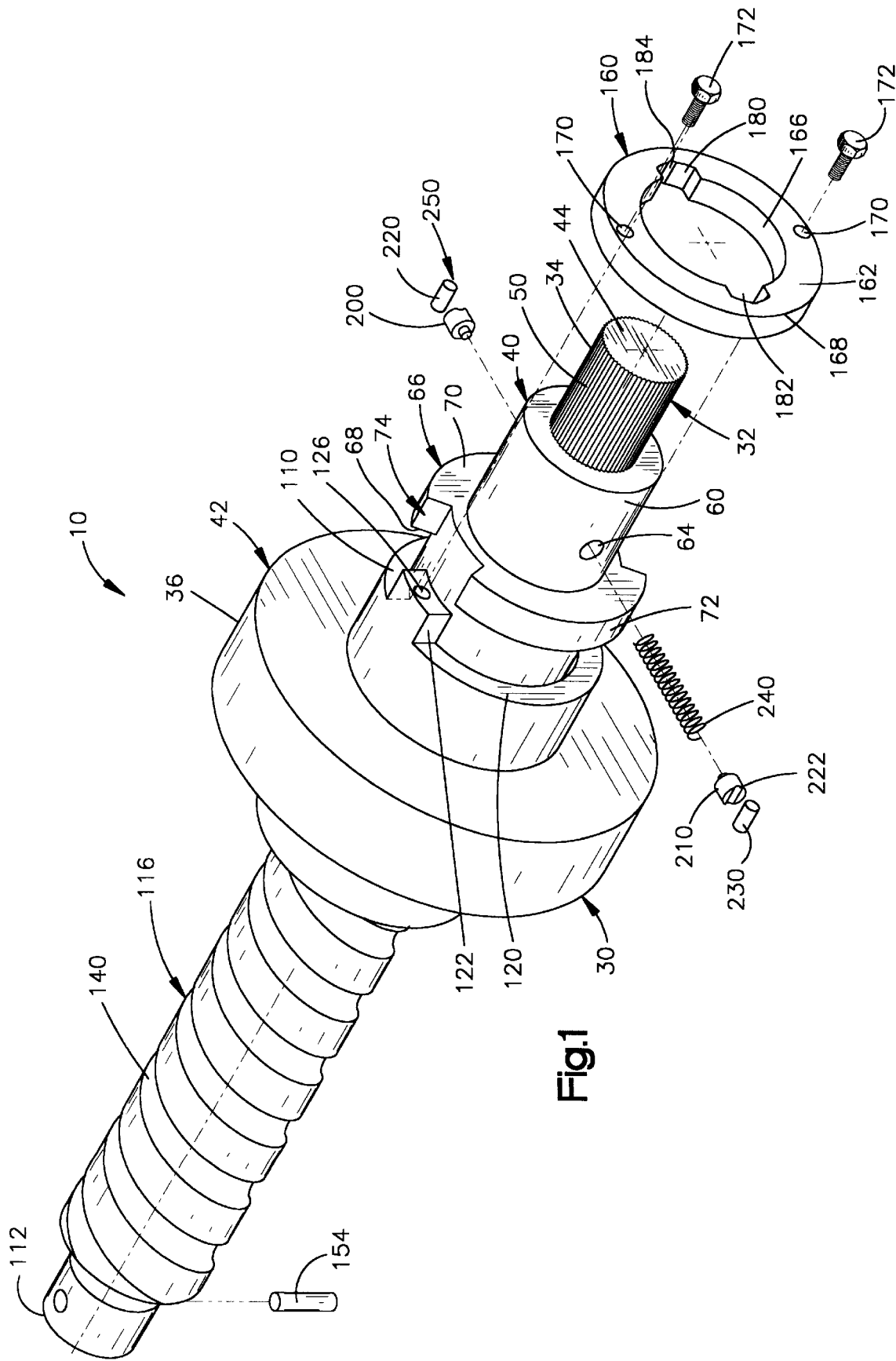
FIG. 1 is an exploded perspective view of a portion of an integral hydraulic power steering gear with parts omitted for clarity and constructed in accordance with the present invention.

The present invention is illustrated as applied to a hydraulic power steering gear 10 (FIG. 1) for turning dirigible wheels (not shown) of a vehicle to effect steering of the vehicle. The power steering gear 10 is an integral hydraulic power steering gear and includes a two-piece housing 12 (FIG. 2) having a hydraulic power cylinder 14. The power cylinder 14 comprises a chamber 16 divided into two chamber portions 18 and 20, respectively, by a piston 22. The piston 22 includes an inner bore 23 with a helical groove 24. The piston 22 also has a set of external teeth 25 which mesh with a sector gear 26. The sector gear 26 is fixed to an output shaft 28 which extends outwardly from the housing 12. The output shaft 28 is connected to a pitman arm (not shown) which, in turn, is connected via steering linkage (not shown) to the dirigible wheels of the vehicle to steer the vehicle. As the piston 22 moves in the chamber 16, the output shaft 28 is rotated to operate the steering linkage.

A hydraulic control valve assembly 30 controls the flow of pressurized hydraulic fluid between a hydraulic circuit including a hydraulic pump (not shown) and one of the chamber portions 18, 20 to control the direction and amount of steering. The valve assembly 30 is actuated by a rotatable input shaft 32 coupled for rotation with a manually rotatable vehicle steering wheel (not shown).

The valve assembly 30 comprises first and second valve members 34 and 36, respectively. The valve members 34, 36 are relatively rotatable about a valve axis 38. The first valve member 34 comprises a valve core 40 and the second valve member 36 comprises a valve sleeve 42. The valve core 40 is located coaxially within the valve sleeve 42 and is supported for rotation by the valve sleeve.

The valve core 40 is formed integrally as one piece with the input shaft 32. The valve core 40 has oppositely disposed first and second end portions 44 and 46, respectively, and a valve section 48 between the end portions. The first end portion 44 of the valve core 40 projects beyond the valve sleeve 42 and the second end portion 46 of the valve core lies within the valve sleeve. The first end portion 44 includes splines 50 for connecting to a steering shaft (not shown) coupled to the vehicle steering wheel.

Figure 3:
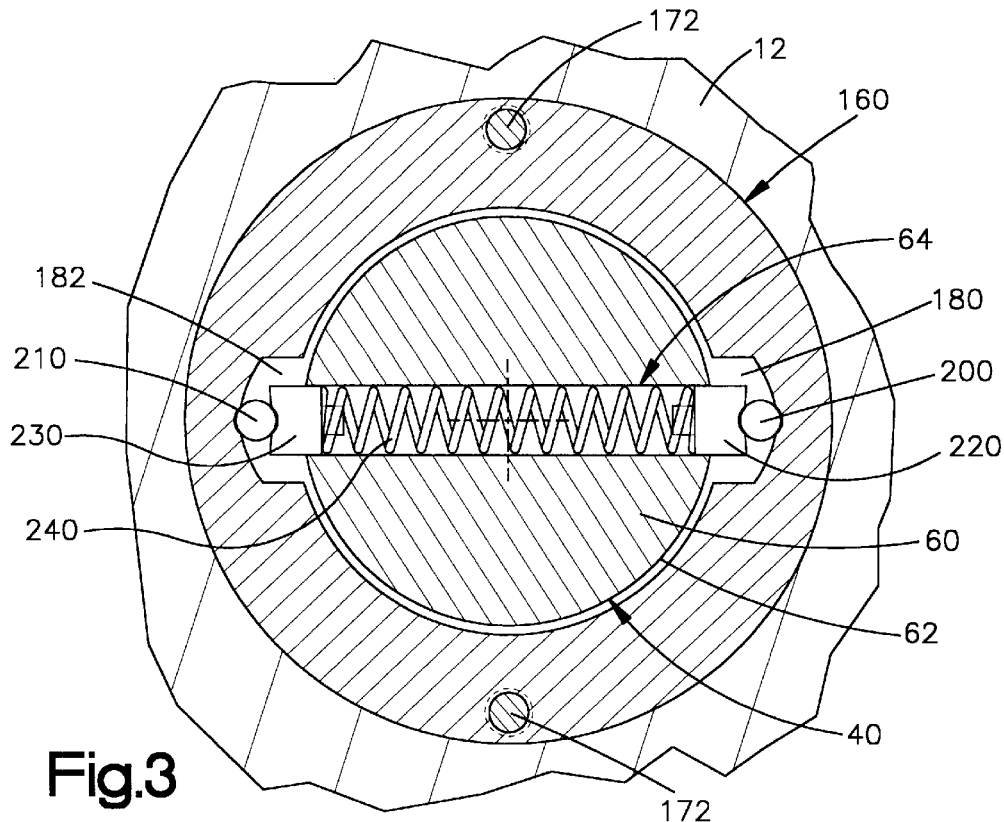
FIG. 3 is a view taken along line 3—3 in FIG. 2.

Adjacent the first end portion 44, the valve core 40 includes a shank section 60 having a cylindrical outer surface 62 (FIG. 3). A radially extending passage 64 extends diametrically through the shank section 60 of the valve core 40. The shank section 60 of the valve core 40 further includes an annular collar 66 (FIG. 1) extending radially outward from the cylindrical outer surface 62. The collar 66 has first and second radially extending surfaces 68 and 70, respectively, connected by an axially extending peripheral surface 72. The peripheral surface 72 includes a pair of diametrically opposed radial cut-outs 74 and 76, respectively. Each of the radial cut-outs 74, 76 is defined by first and second radial surfaces 78 and 80, respectively, connected by a third arcuate surface 82 extending between the first and second radial surfaces.

The valve section 48 of the valve core 40 has a circumferentially spaced plurality of axially extending grooves 90 (FIG. 2) as is known in the art. A first portion of the grooves 90 are fluidly connected with an internal passage 92 extending from the valve section 48 of the valve core 40 to the second end portion 46. The internal passage 92 communicates via passages (not shown) with the return line of the hydraulic pump circuit. A second portion of the grooves 90 are in fluid communication with axially extending grooves 130 in the valve sleeve 42 as described below.

Figure 2:
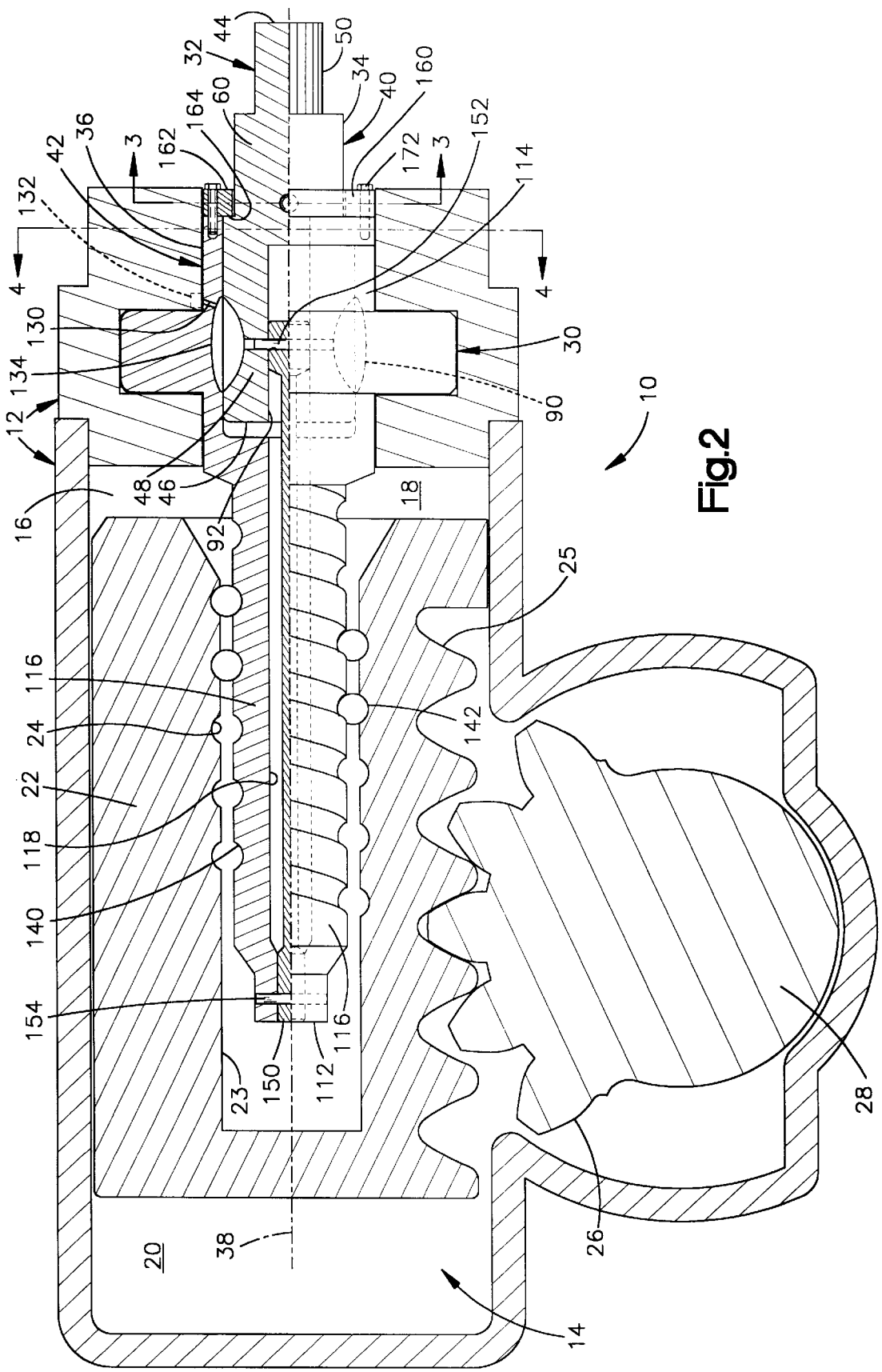
FIG. 2 is a sectional view of the power steering gear of FIG. 1.

The valve sleeve 42 has oppositely disposed first and second ends 110 and 112, respectively (FIG. 1). The valve sleeve 42 further includes a sleeve section 114 (FIG. 2) adjacent the first end 110 and a ball screw section 116 adjacent the second end 112. An axially extending passage 118 extends from the first end 110 of the valve sleeve 42 through the sleeve section 114 and the ball screw section 116 to the second end 112.

Figure 4:
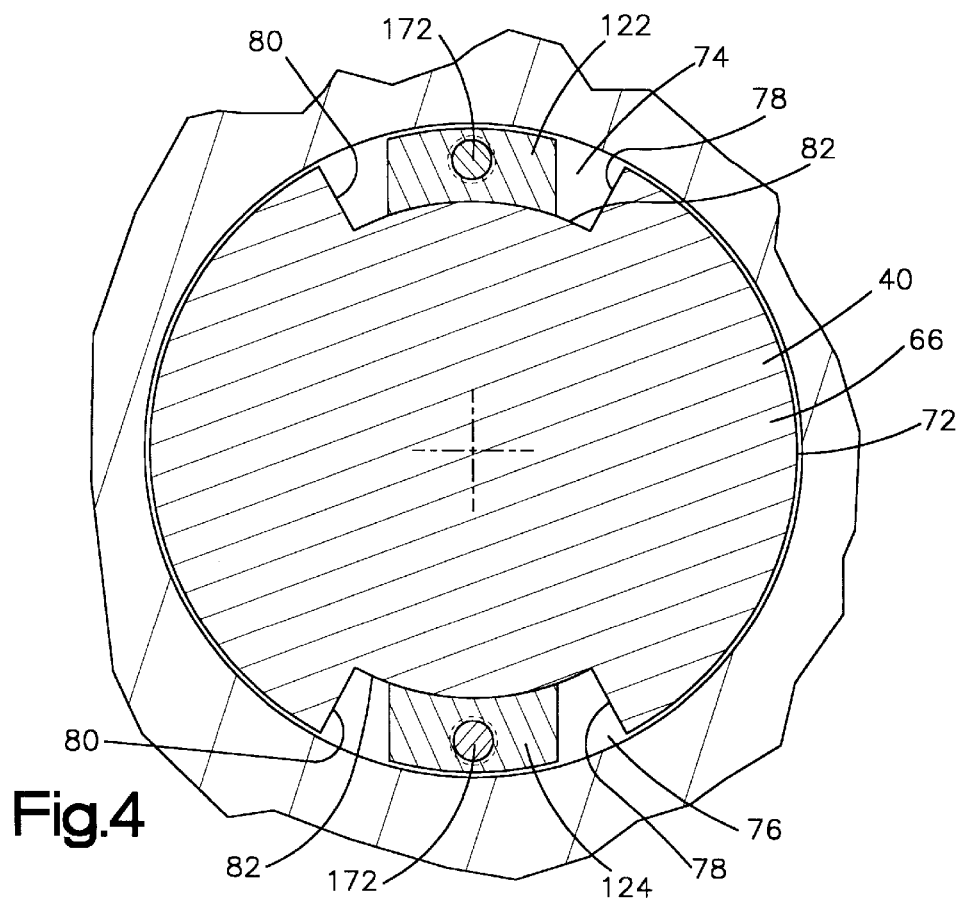
FIG. 4 is a view taken along line 4—4 in FIG. 2.

The first end 110 of the valve sleeve 42 includes a radially extending surface 120 (FIG. 1). A pair of axially projecting lugs 122 and 124 extend from the radially extending surface 120. The lugs 122 and 124 are diametrically opposed to one another and are dimensionally smaller than the diametrically opposed cut-outs 74 and 76 in the valve core 40. The lugs 122 and 124 are disposed in the cut-outs 74 and 76, respectively (FIG. 4) and are adapted to engage one of the first and second surfaces 78 and 80 defining each cut-out upon rotation of between 2° and 8° of the valve core 40 relative to the valve sleeve 42. The engagement of the lugs 122 and 124 with the cut-outs 74 and 76, respectively, in the valve core 40 will cause the valve sleeve 42 to be rotated along with the valve core. Such rotation of the valve sleeve 42 will cause the piston 22 to move axially in the chamber 16 and, hence, will allow for manual steering of the vehicle even if a loss in hydraulic fluid pressure has occurred. Each of the lugs 122, 124 includes an axially extending opening 126 (FIG. 1) which is internally threaded.

The sleeve section 114 of the valve sleeve 42 has a plurality of radially directed passages 130 extending from its outer circumference to its inner circumference. The passages 130 communicate with an annular chamber 132 in the housing 12 which is fluidly connected to the hydraulic pump. A plurality of axially extending grooves 134 are formed in the inner surface of the valve sleeve 42 as is known in the art. The grooves 134 fluidly communicate with the second portion of the grooves 90 in the valve core 40. Further, a first portion of the grooves 134 in the valve sleeve 42 fluidly communicate via passages (not shown) with the first chamber portion 18 in the housing 12, and a second portion of the grooves 134 fluidly communicate via passages (not shown) with the second chamber portion 20 in the housing. As is known in the art, when the valve core is rotated relative to the valve sleeve 42, hydraulic fluid is ported through the grooves 90 and 134 and associated passages to one of the chamber portions 18 and 20, while the hydraulic fluid is vented from the other chamber portion, thereby causing the piston 22 to move accordingly.

The ball screw section 116 of the valve sleeve 42 includes a helical groove 140 formed on its outer periphery. A plurality of balls 142 are located in the helical groove 140. The balls 142 are also located in the helical groove 24 in the bore 23 formed in the piston 22. As is well known in the art, axial movement of the piston 22 causes the ball screw portion 116 to rotate which, in turn, causes the rest of the valve sleeve 42 to rotate.

A torsion bar 150 (FIG. 2) connects the valve core 40 and the valve sleeve 42. One end of the torsion bar 150 is connected by a pin 152 to the valve section 48 of the valve core 40, while the other end of the torsion bar extends through the passage 118 in the valve sleeve 42 and is connected by a pin 154 adjacent the second end 112 of the valve sleeve.

The steering gear 10 includes a ring member 160 (FIG. 1) which is attached to the valve sleeve 42. The ring member 160 has parallel first and second radially extending surfaces 162 and 164 (FIG. 2), respectively, which are connected by cylindrical inner and outer surfaces 166 and 168, respectively (FIG. 1). A pair of diametrically opposed clearance holes 170 extend axially between the radially extending surfaces 162 and 164. The first radially extending surface 164 abuts the radially extending surface 70 of the collar 66 of the valve core 40. A threaded fastener 172 extends through each of the clearance holes 170 in the ring member 160 and into the threaded openings 126 at the first end 110 of the valve sleeve 42 to secure the ring member to the valve sleeve.

Figure 5:
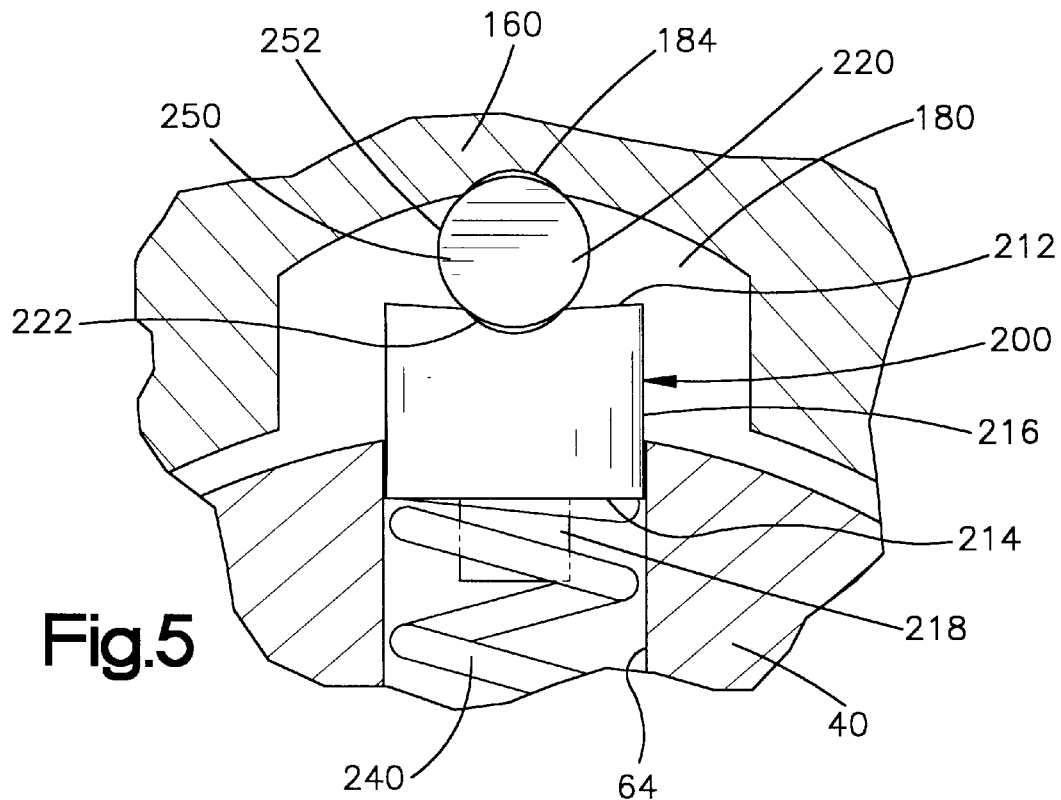
FIG. 5 is an enlarged view of a portion of FIG. 3 with the power steering gear in a neutral steering condition.
Figure 6:
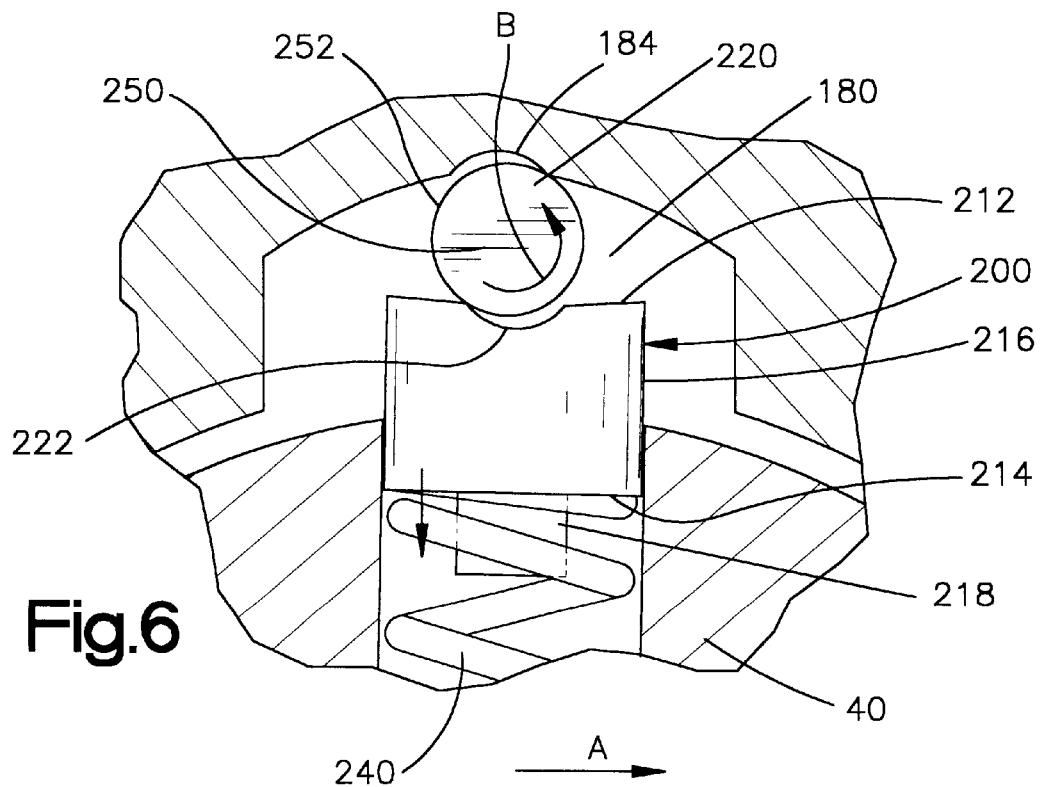
FIG. 6 is a view similar to FIG. 5 with the power steering gear in an actuated condition.

The inner surface 166 of the ring member 160 includes diametrically opposed first and second recesses 180 and 182, respectively (FIG. 3). The recesses 180, 182 generally radially align with the passage 64 extending through the valve core 40. Each of the recesses 180, 182 in the inner surface 166 includes a centrally located cam surface in the form of an arcuate notch 184. According to a preferred embodiment of the present invention, the arcuate notches 184 have a transversely extending semi-cylindrical configuration, as best seen in FIGS. 5 and 6.

The steering gear 10 further includes first and second plunger members 200 and 210, respectively, first and second detent members 220 and 230, respectively, and a compression spring 240. The first and second plunger members 200 and 210 are identical in shape and are disposed diametrically opposite one another in the passage 64 through the valve core 40. As shown in FIG. 5, each of the plunger members 200, 210 has a radially outer end surface 212, a radially inner end surface 214, and a cylindrical outer surface 216 extending between the end surfaces. The radially inner end surface 214 of each plunger member 200, 210 includes a spring pilot projection 218 extending radially inward. The terminal ends of the spring 240 fit over the respective spring pilot projection 218 on each plunger member 200, 210 to position the spring against both of the plunger members and to keep the spring from frictionally contacting the passage 64 in the valve core 40. The spring member 240 biases the plunger members 200 and 210 radially outward.

The radially outer surface 212 of each of the plunger members 200 and 210 includes an arcuate indentation 222. According to a preferred embodiment of the invention, the arcuate indentations 222 have a transversely extending semi-cylindrical configuration.

The first and second detent members 220 and 230 are disposed diametrically opposite one another between the ring member 160 and the first and second plunger members 200 and 210, respectively. The first detent member 220 is located between the first plunger member 200 and the first recess 180 in the inner surface 166 of the ring member 160. The second detent member 230 is located between the second plunger member 210 and the second recess 182 in the inner surface 166 of the ring member 160. The first and second detent members 220 and 230 thus act between the valve sleeve 42 and the valve core 40.

The first and second detent members 220 and 230 are identical in configuration. According to a preferred embodiment of the invention, the detent members 220 and 230 comprise transversely extending pins 250. Each of the pins 250 has a cylindrical outer surface 252. Preferably, the radius of curvature of the pins 250 is slightly larger than the radius of curvature of the arcuate notches 184 in the ring member 160, and is slightly larger the radius of curvature of the arcuate indentations 222 in the plunger members 200, 210. The radius of curvature of the arcuate indentations 222 is approximately the same size as the radius of curvature of the arcuate notches 184.

The steering gear 10 is operable between a neutral steering condition, in which the vehicle is being driven in a straight line, and an actuated steering condition, in which the vehicle is being turned, to steer the vehicle. In the neutral condition shown in FIGS. 3 and 5, the first detent member 220 is disposed in a respective one of the arcuate notches 184 in the ring member 160 and is also disposed in the arcuate indentation 222 in the first plunger member 200. Similarly, the second detent member 230 is disposed in a respective one of the second arcuate notches 184 in the ring member 160 and is also disposed in the arcuate indentation 222 in the second plunger member 210.

When the vehicle steering wheel is turned by the driver, the valve core 40 is rotated relative to the valve sleeve 42 and the ring member 160 attached to the valve sleeve. This relative rotation, shown in FIG. 6 as rotation in the direction of arrow A, causes the first and second detent members 220 and 230 to rotate in the opposite direction indicated by arrow B and to move out of the arcuate notches 184 in the ring member 160 and out of the arcuate indentations 222 in the plunger members 200, 210. The movement of the detent members 220, 230 applies a radially inwardly directed force on the outer surface 212 of each of the plunger members 200 and 210, causing the plunger members to move radially inward against the bias of the spring 240.

A change in steering torque needed for the driver to turn the vehicle steering wheel is felt by the driver when the detent members 220 and 230 are moved in and out of the arcuate notches 184, and the arcuate indentations 222 in the plunger members 200, 210. As graphically depicted in FIG. 7, the steering torque is highest when the steering gear 10 is initially moved from the neutral condition to the actuated condition, such as during a lane change. During further rotation of the steering wheel and, thus, the valve core 40, the steering torque required to turn the steering wheel tapers off. As the steering wheel is returned toward the neutral steering condition though, the steering torque required, and thus felt by the driver, again increases. This increase in steering torque results from the detent members approaching a re-positioning of themselves in the arcuate notches 184 and the arcuate indentations 222. When the detent members 220, 230 are once again disposed in the arcuate notches 184 and in the arcuate indentations 222, the steering torque drops to zero. The aforementioned changes in steering torque required to operate the steering gear 10 between the neutral condition and the actuated condition are physically perceptible by the driver of the vehicle and thus provide the driver with a feel for when the steering gear is "on-center". The difference C shown in the torque curve is the result of friction in the steering gear 10. It should be noted that the contribution of the torsion bar 150 to the steering torque is not shown in the graph of FIG. 7.

The magnitude of the steering torque required to operate the steering gear 10 in and out of the neutral condition is determined by the size and/or shape of the arcuate notches 184 and the arcuate indentations 222. For example, if the radii of curvature of the arcuate notches 184 and the arcuate indentations 222 were substantially smaller than the radius of curvature of the detent members 220 and 230, the steering torque needed to move the detent members in and out of the notches and the indentations would be decreased. Further, it is contemplated that the radii of curvature for the notches 184 and the indentations 222 could be different from each other in order to optimize a steering torque feel for the driver.

In addition to providing the driver of the vehicle with an "on-center" feel, the steering gear 10 is self-centering by virtue of the diametrically opposed detent members 220 and 230 and associated plunger members 200 and 210. The inwardly directed reaction forces on the detent members 220 and 230 which oppose the bias of the spring 240 cancel each other out and thus there is no side or eccentric load on the valve core 40. In addition, the steering gear 10 is equipped to compensate for tolerance variations in the manufacturing of the ring member 160. For example, if the arcuate notches 184 were not properly located perpendicular to the radially extending surfaces 162 and 164 of the ring member 160, the cylindrical shape of the plunger members 200 and 210 will allow the plunger members to rotate in the passage 64 through the valve core 40 and the detent members 220 and 230 to rotate in a transverse yaw direction until the detent members align with the off-center notches 184. This feature also reduces friction in the steering gear 10.

Figure 7:
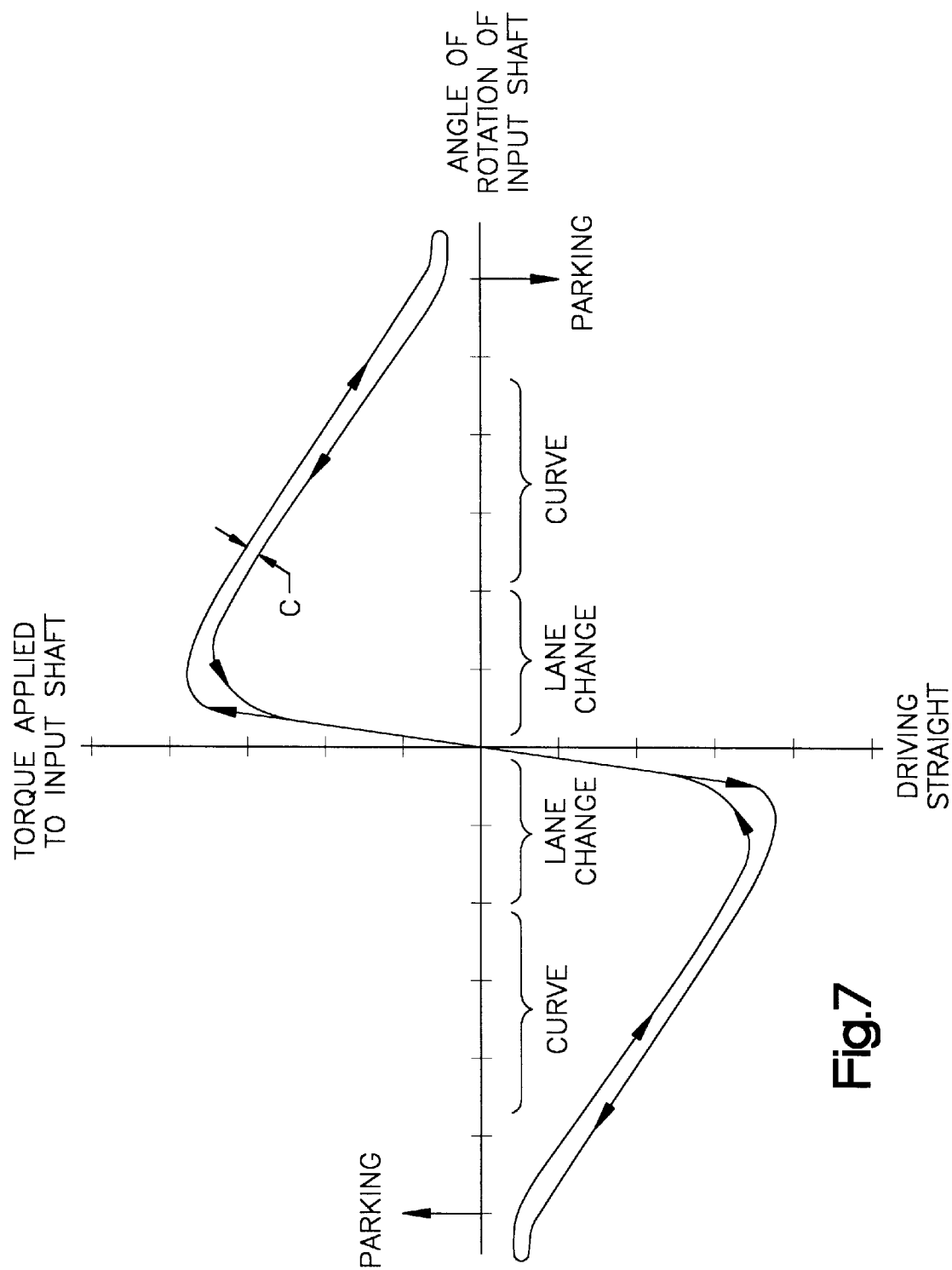
FIG. 7 is a graph of the torque required to rotate the power steering gear versus the angle of rotation of the power steering gear.
Figure 8:
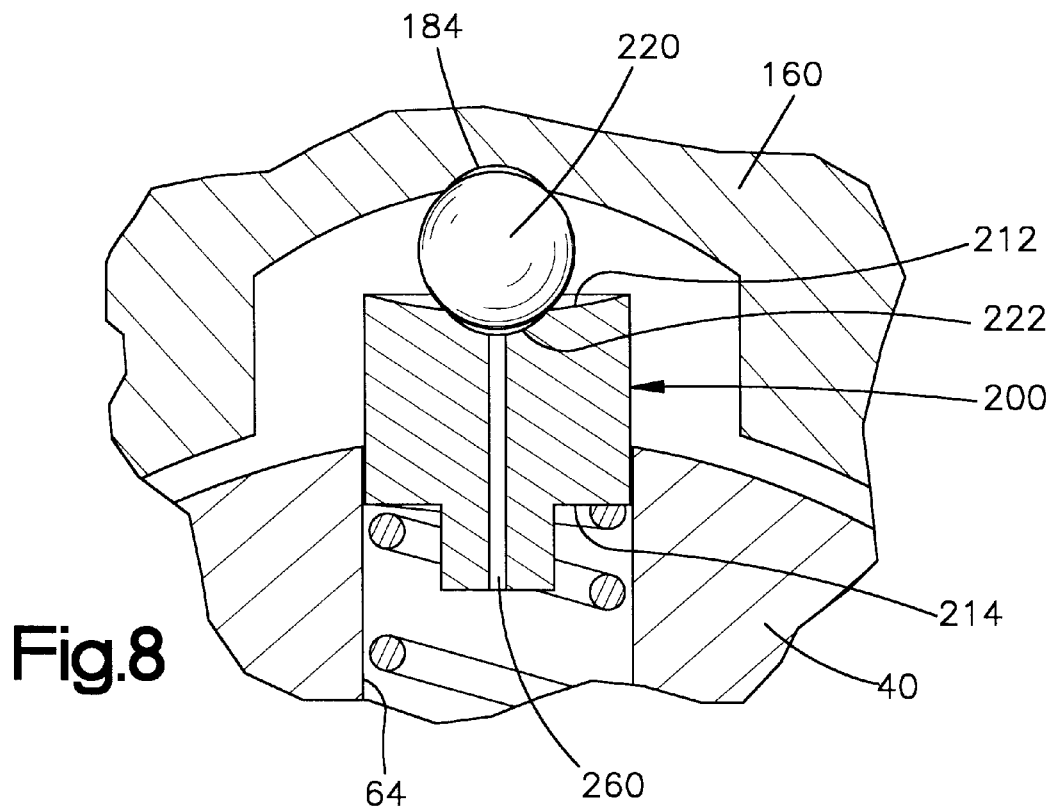
FIG. 8 is a view similar to FIG. 5 showing an alternate embodiment of the present invention.

FIG. 8 illustrates an alternate embodiment of the present invention. In FIG. 7, the plunger member 200 includes a centrally located bore 260 extending from the radially inner surface 214 to the arcuate indentation 222 at the radially outer surface 212. The bore 260 provides for hydraulic fluid to flow from the passage 64 in the valve core 40. When the detent member 200 is moved out of the arcuate indentation 222 and, hence, out of the neutral condition, hydraulic flow is forced out of the passage 64 through the bore 260. The combination of the spring 240 and the plunger member 200 with the bore 260 act like a shock absorber to dampen vibrations. Further, the hydraulic fluid flow through the bore 260 dampens noise generated by the rotational movement of the valve core 40 in the steering gear 10.

Figure 9:
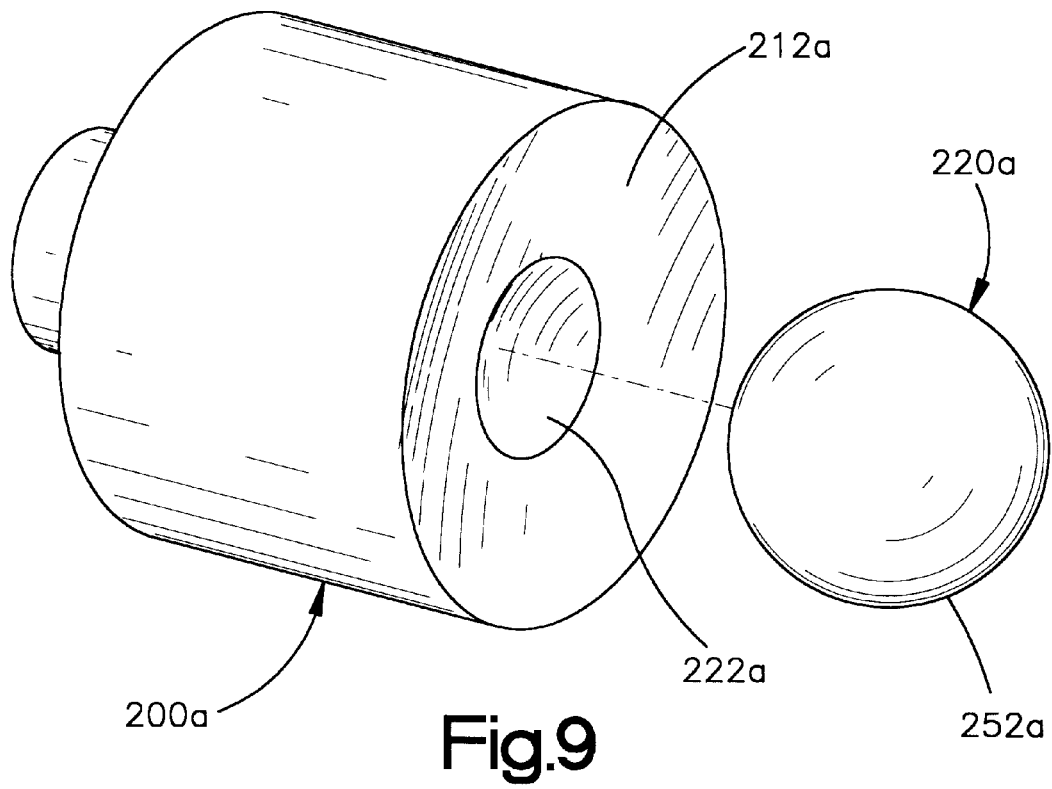
FIG. 9 is an exploded perspective view illustrating an alternate construction of a part of the present invention.

FIG. 9 illustrates another alternate embodiment of the present invention in which a ball-shaped detent member 220a replaces the previously described cylindrical detent member 220. Parts in the alternate embodiment of FIG. 9 which are similar to parts previously described carry the same reference number, but with the suffix "a" attached. In accordance with the embodiment of FIG. 9, the arcuate indentation 222a in the plunger member 200a has a semi-spherical configuration to correspond with the spherical outer surface 252a of the detent member 220a. The radially outer surface 212a of the plunger member 200a also has a semi-spherical configuration. Further, the corresponding arcuate notches 184 in the ring member 160 also have a semi-spherical configuration. The detent member 220a and the plunger member 200a function in the same manner as the detent member and plunger member of the previous embodiment to provide an "on-center" feel to the driver of the vehicle.

From the above description of the invention, those skilled in the art will perceive improvements, changes and modifications. For example, the structure of the steering gear 10 which provides the "on-center" feel to the driver could be applied to other types of steering gears other than an integral steering gear. Such improvements, changes and modifications within the skill of the art are intended to be covered by the appended claims.

Having described the invention, we claim:

1. A hydraulic power steering gear for a vehicle, said power steering gear being operable between a neutral condition and an actuated condition, said power steering gear comprising:

first and second valve members disposed coaxial to one another and which are rotatable relative to one another to selectively port hydraulic fluid, said first valve member including a radially extending passage, said second valve member having a cam surface associated with said second valve member;

a detent member acting between said first and second valve members, said detent member having a curved outer surface; and a spring for biasing said detent member radially outward against said cam surface, said spring being disposed in said radially extending passage in said first valve member, said detent member being disposed in said cam surface associated with said second valve member in the neutral condition to provide a physically perceptible indication to a driver of the vehicle of operation between the neutral condition and the actuated condition.

2. The power steering gear of claim 1 further comprising at least one plunger member disposed in said radially extending passage in said first valve member, said at least one plunger member having an arcuate indentation for supporting said detent member, said detent member being disposed in said arcuate indentation in the neutral condition.

3. The power steering gear of claim 2 further comprising a ring member fixedly attached to said second valve member, said ring member including a cylindrical inner surface, said cam surface associated with said second valve member being formed in said cylindrical inner surface of said ring member.

4. The power steering gear of claim 2 further comprising a torsion bar acting between said first and second valve members.

5. The power steering gear of claim 2 wherein said second valve member has diametrically opposed first and second cam surfaces, said power steering gear including diametrically opposed first and second plunger members and diametrically opposed first and second detent members, said second detent member for cooperating with said second plunger member and said second cam surface.

6. The power steering gear of claim 5 wherein said radially extending passage extends entirely through said first valve member, said spring comprising a compression spring acting against said first and second plunger members.

7. The power steering gear of claim 2 wherein said detent member moves out of said cam surface in said ring member and out of said arcuate indentation in said at least one plunger member in the actuated condition.

8. The power steering gear of claim 2 wherein said detent member is a transversely extending cylindrical pin and said outer surface of said detent member is cylindrical, each of said cam surface and said at least one indentation having a transversely extending semi-cylindrical configuration.

9. The power steering gear of claim 8 wherein said at least one plunger has a central axis intersecting and normal to an axis of said cylindrical detent member, said at least one plunger member being rotatable about said central axis to cause said detent member to rotate in transverse yaw direction to ensure proper alignment of said detent member in said cam surface.

10. The power steering gear of claim 2 wherein said detent member is a ball-shaped member and said outer surface of said detent member is spherical, each of said cam surface and said at least one indentation having a semi-spherical configuration.

11. The power steering gear of claim 2 wherein said at least one plunger member has a radially inner end and a radially outer end at which said at least one indentation is located, said at least one plunger including a bore extending between said ends to allow hydraulic fluid to flow radially outward to dampen vibration and noise generated by said power steering gear.

12. The power steering gear of claim 2 wherein said at least one plunger member moves radially inward against the bias of said spring upon operation of said power steering gear from the neutral condition to the actuated condition.

13. A hydraulic power steering gear for a vehicle, said power steering gear being operable between a neutral condition and an actuated condition, said power steering gear comprising:

a first valve member having a radially extending passage;

a second valve member partially encircling said first valve member, said first and second valve members being rotatable relative to one another to selectively port hydraulic fluid;

a ring member fixedly attached to said second valve member, said ring member having a cylindrical inner surface with at least one arcuate notch;

at least one detent member acting between said first and second valve members, said at least one detent member having a curved outer surface and being disposed in said at least one arcuate notch in said inner surface of said ring member in the neutral condition to provide a physically perceptible indication to a driver of the vehicle of operation between the neutral condition and the actuated condition; and spring means for biasing said at least one detent member radially outward, said spring means being disposed in said passage in said first valve member.

14. The power steering gear of claim 13 further comprising at least one plunger member disposed in said passage in said first valve member between said spring means and said at least one detent member, said at least one plunger member being biased radially outward against said detent member by said spring means, said at least one plunger member having an arcuate indentation, said at least one detent member being disposed in said arcuate indentation in said plunger member in the neutral steering condition.

15. The power steering gear of claim 14 further comprising a torsion bar acting between said first and second valve members.

16. The power steering gear of claim 14 wherein said at least one arcuate notch comprises diametrically opposed first and second arcuate notches, said at least one plunger member comprises first and second plunger members disposed diametrically opposite one another, and said at least one detent member comprises oppositely disposed first and second detent members.

17. The power steering gear of claim 14 wherein said at least one detent member moves out of said at least one arcuate notch in said ring member and out of said arcuate indentation in said at least one plunger member in the actuated condition.

18. The power steering gear of claim 14 wherein said at least one detent member is a transversely extending cylindrical pin and said outer surface of said at least one detent member is cylindrical, each of said at least one arcuate notch and said at least one indentation having a transversely extending semi-cylindrical configuration.

19. The power steering gear of claim 14 wherein said at least one detent member is a ball-shaped member and said outer surface of said at least one detent member is spherical, each of said at least one arcuate notch and said at least one indentation having a semi-spherical configuration.

20. The power steering gear of claim 14 wherein said at least one plunger member has a radially inboard end and a radially outboard end at which said at least one indentation is located, said at least one plunger including a bore extending between said ends to allow hydraulic fluid to flow radially outward to dampen vibration and noise generated by said power steering gear.

21. The power steering gear of claim 14 wherein the torque necessary to rotate said first valve member relative to said second valve member reduces from an initially relatively high torque to a subsequent relatively low torque upon continued rotation of said first valve member.

22. The power steering gear of claim 14 wherein said first valve member comprises a valve core and said second valve member comprises a valve sleeve.

* * * * *